INVENTORS
PAUL R. HONAN
ORIEN K. NORTON
BY
Woodard, Weikart, Emhardt & Naughton
Attorneys INVENTORS
PAUL R. HONAN
ORIEN K. NORTON
BY
Woodard, Weikart, Emhardt & Naughton
Attorneys

United States Patent Office 3,585,133
Patented June 15, 1971

3,585,133
UP-FLOW SELF-CLEANING FILTER APPARATUS
Paul R. Honan and Orien K. Norton, Lebanon, Ind.,
assignors to Monlan, Inc., Lebanon, Ind.
Filed Apr. 30, 1969, Ser. No. 820,484
Int. Cl. B01d 29/04
U.S. Cl. 210—411                                          1 Claim

ABSTRACT OF THE DISCLOSURE

A filtering apparatus of the type having a filtered liquid receptacle nested within a raw liquid tank with the bottom of the filtered liquid receptacle formed of a filter media. The receptacle has a flexible closure or top wall which is periodically moved toward and away from the filter media to back-wash clean fluid through it to remove filtered material collecting on the filter media. The material washed off the filter media settles in the raw liquid tank.

---

This invention relates generally to apparatus for industrial filtering and in particular to an apparatus for continuously filtering liquids such as the cutting, cooling or lubricating liquids used in the operation of power tools.

Apparatus of the type referred to conventionally includes an incoming liquid tank, some means for removing solids which settle out of the incoming liquid, and a filter passage for the liquid to a filtered and an output liquid reservoir. The filters can be formed of any well-known filtering medium, and, customarily, are removable for replacement. U.S. Patent 2,940,595 discloses filtering apparatus having features generally as outlined above.

The apparatus of the present invention represents an improvement over the prior art devices in that it utilizes an upward flow of the raw fluid through a horizontally disposed filter element and provides for pumping clean fluid, by means of a diaphragm motion, back through the filter element, either periodically or under the control of a liquid level responsive member, so that solids filtered from the liquid and adhering to the underface of the filter element will be washed and broken loose and can then settle, by gravity, to the base of the tank. This intermittent pumping of clean fluid reversely through the filter element permits the renewal or restoration of the filter element without necessitating its removal and, most importantly, without requiring the shut-down of fluid flow and the equipment served by the filtering apparatus.

The apparatus of the present invention is generally similar to that disclosed and claimed in Honan et al. Patent 3,385,448. It differs in that periodic cleaning of the filter element is accomplished by forcing a large volume of liquid reversely through the element by moving one complete wall of the filter assembly toward the wall of the assembly formed by the filter element. The pumping stroke is relatively rapid and the back stroke is relatively slow to prevent redepositing of filtered material back on the filter element. The filter assembly including the diaphragm and its actuating means are hinged to the liquid tank frame so that it can be swung upwardly to facilitate replacement of the filter element.

DESCRIPTION OF THE PREFERRED EMBODIMENTS

Figure 1:
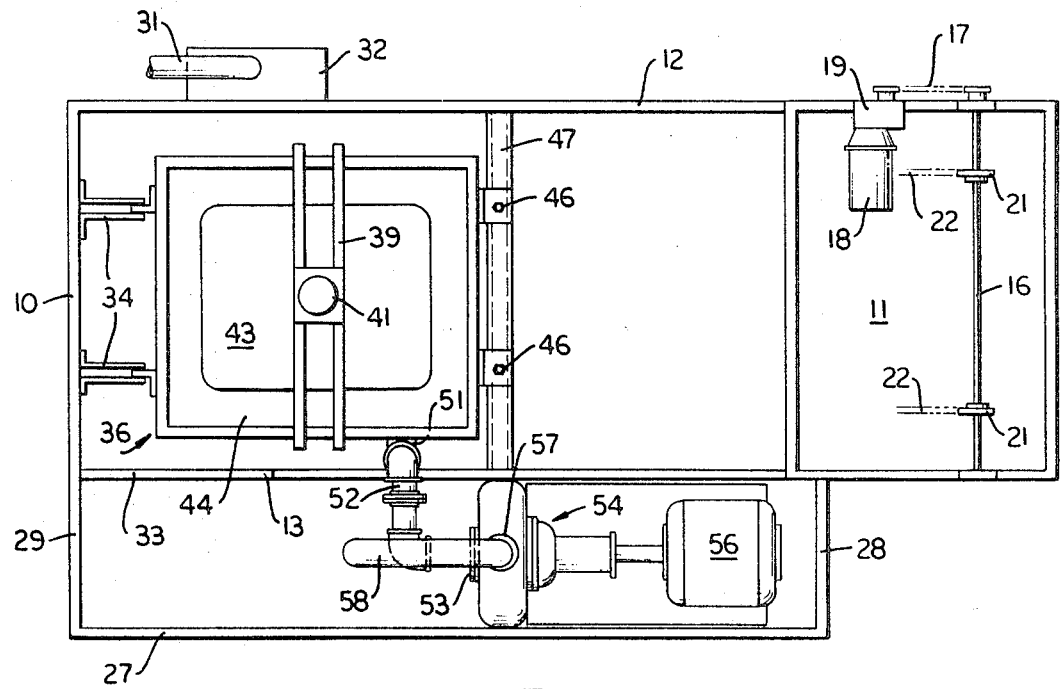
FIG. 1 is a top plan view of a filtering apparatus embodying the present invention.
Figure 2:
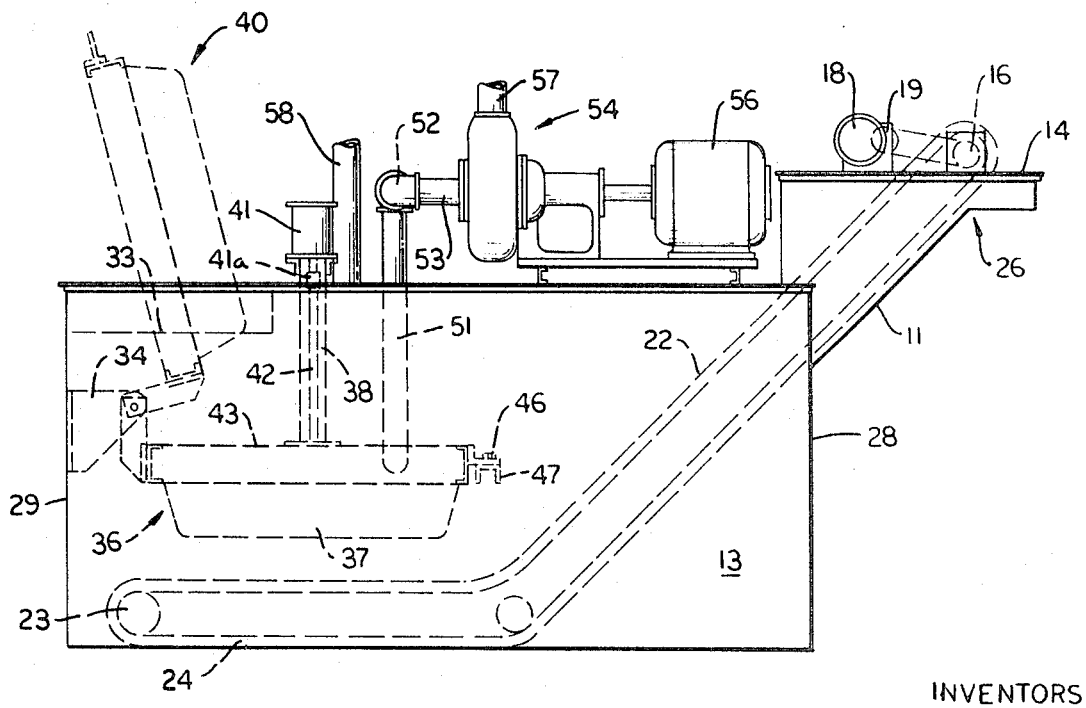
FIG. 2 is a side view of the apparatus of FIG. 1.
Figure 3:
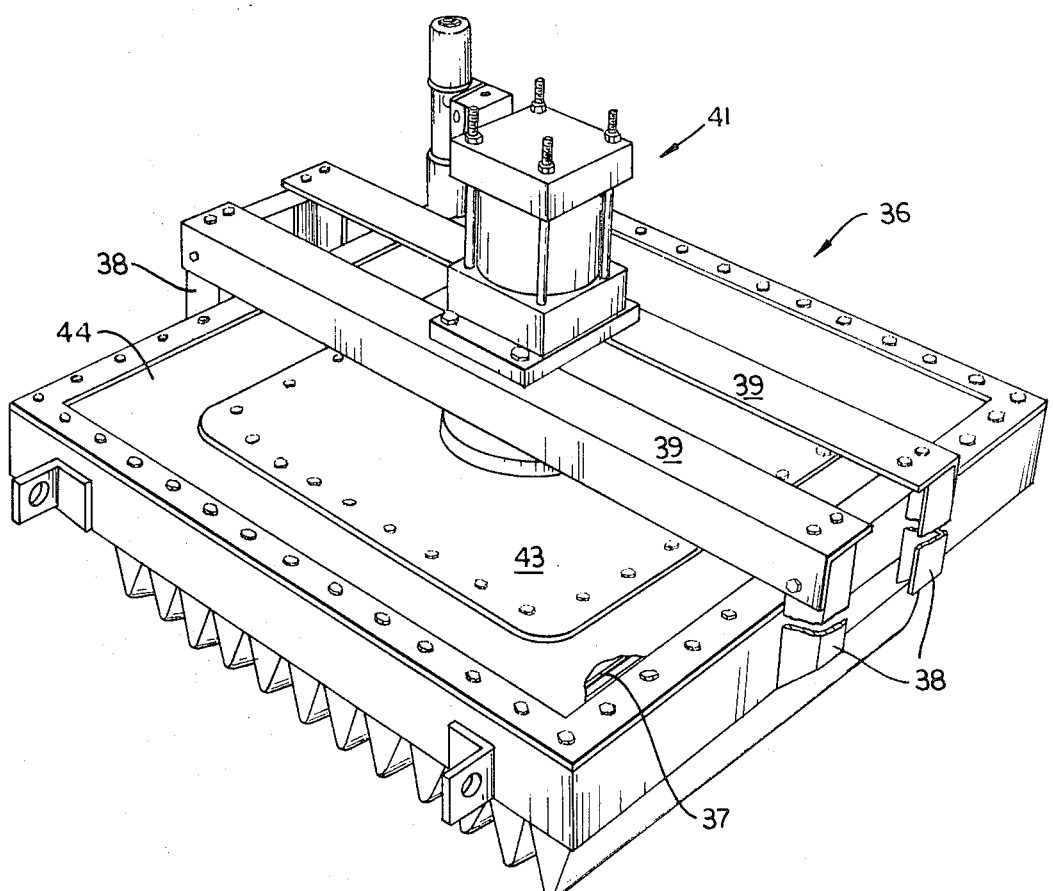
FIG. 3 is an enlarged perspective view of the filter assembly with a portion of the diaphragm component broken away to reveal the interior structure.

Referring initially to FIGS. 1, 2 and 3, the liquid filtering apparatus includes an outer housing or tank having an end wall 10, an opposite inclined end wall 11 (FIG. 1) and sidewalls 12 and 13. At the upper end of the inclined end wall 11, structural members 14 journal a transverse shaft 16 which is driven by means of a chain or belt drive, indicated at 17 in FIG. 1. An electric motor 18, carried by the speed reducing mechanism 19, serves to drive the chain 17.

The shaft 16 carries sprockets 21 and these serve to move the endless chains 22. The chains 22 are accommodated by idler sprockets or rollers 23 (FIG. 2) in the lower portion of the unfiltered liquid tank formed by the sidewalls 12 and 13 and the end walls 10 and 11. The chains carry a series of spaced conveyor elements 24, which may take the form of angle irons, as shown in FIG. 1. The function of conveyor elements 24 and the chains 39, as disclosed in previously mentioned U.S. Patent 3,385,448, is to sweep across the bottom of the unfiltered liquid tank, the conveyor elements moving from left to right as viewed in FIG. 1, to remove solids which have settled to the base of the tank and deliver them over the upper edge of the inclined wall 11, the area indicated generally at 26 in FIG. 2. The material thus delivered may be caught in a receptacle (not shown) set below the upper edge of the inclined wall, 11. The arrangement for removing solids from the base of the unfiltered tank and delivering them to the exterior of the tank forms, in itself, no part of the present invention.

As previously mentioned, a filter tank, acting as a reservoir of unfiltered liquid, is formed by the sidewall 13, the sidewall 12 and the end walls 10 and 11. Parallel to and spaced from the sidewall 13 is an additional sidewall 27 which, with auxiliary end walls 28 and 29 form a clean liquid compartment or tank which extends adjacent the unfiltered liquid tank. The reservoir of unfiltered liquid may be supplied from a pipe indicated at 31 in FIG. 1, the out flow from the pipe entering the tank through the inlet cup 32. The pipe 31 may be supplied by the return line from the machine or tool utilizing the liquid as a cutting or cooling medium and, it will be understood, a settling tank might be interposed between the machine liquid return line and the pipe 31. As will be evident from FIGS. 1 and 2 the sidewall 13 is undercut somewhat as indicated at 33 in FIG. 2 to provide an overflow weir by means of which unfiltered liquid might pass from the unfiltered liquid tank into the clean liquid tank, bypassing the filter apparatus to be subsequently described, under emergency situations. Normally, however, there is a flow from the clean liquid tank into the unfiltered liquid tank over the weir 33 since the filter pump must provide at least a small surplus of filtered fluid to the filtered liquid tank to assure availability of a full filtered liquid supply.

Brackets 34, extending inwardly from the end wall 10 serve to pivotally support a filtered liquid receptacle indicated generally at 36. As illustrated, the receptacle is generally rectangular in cross section and, as illustrated in detail in FIG. 3, consists of a generally rectangular frame, within which are disposed formed wire elements 37 which act to support a pleated filter media of the general type illustrated in U.S. Patent 3,385,448 previously mentioned.

Secured to the sides of the frame are angle irons 38 vertically positioned, which support transverse angle iron members 39 extending across the filter receptacle. Centrally supported on the transverse members 39 is a conventional air cylinder indicated generally at 41. As may best be seen in FIG. 2, the air cylinder has protruding from its lower face an actuating member 41a which is connected by a suitable linkage 42 to the rigid, central pressure plate 43 carried by a flexible diaphragm 44. As may best be seen in FIG. 3, the diaphragm 44 is clamped at its outer margin to the rectangular frame of the filter receptacle and thus forms a movable, upper wall for the receptacle with, it will be understood, the filter media itself, pleated in configuration, forming the lower wall of the generally rectangular receptacle. The receptacle thus takes the form of a generally rectangular chamber with a movable upper wall and with a lower wall formed by the pleated face of the filter material. The filtered liquid receptacle 36 may be pivotally moved to a raised position (indicated at 40 in FIG. 2) carrying with it cylinder 41 and associated parts. This raised position permits changing of the filter medium without draining the filter tank.

As may best be seen in FIGS. 1 and 2, the margin of filter receptacle 36 remote from the hinges is secured as indicated at 46 to a transverse structural member 47 which extends across the unfiltered liquid tank. The height of the upright members 38 supporting the air cylinder 41, is such that, while the filter receptacle 36 is positioned below the normal liquid level in the unfiltered liquid tank, the air cylinder 41 is disposed above the liquid level.

A means for drawing or pumping liquid from the interior of the closed receptacle 36 is provided by means of the flexible tube or pipe 51 (FIG. 2) which communicates with the interior of the receptacle to the side of the receptacle 36. As will be evident from FIG. 1, pipe 51 communicates with a horizontal pipe component 52 which, by means of an elbow is secured to the intake 53 of a centrifugal pump generally indicated at 54 and driven by the electric motor 56. The outlet 57 of the pump 56, by means of the pipe 58, is directed downwardly into the filtered liquid reservoir provided by the sidewalls 13 and 37 and end walls 28 and 29.

In operation, with fluid flowing from the equipment being serviced by the filtering apparatus, through the pipe 31 and into the unfiltered liquid tank or reservoir, the unfiltered fluid level will rise within the tank and fluid will move upwardly through the filter media into the filtered liquid receptacle. Fluid will be pumped from the receptacle, through the pipe 51, by means of the pump 54 and delivered to the filtered fluid reservoir formed by the sidewalls 13 and 27 and end walls 28 and 29. As solids accumulate on the underface of the filter media, some will fall to the base of the unfiltered liquid tank to be removed by the conveyors 24. However, there will be a gradually built-up accumulation of solids on the exterior face of the filter media. The air cylinder 41 and the movable wall for the filtered fluid receptacle 36, formed by the diaphragm 44, serves to periodically remove this accumulation. The air cylinder, of conventional type, may be adjusted to provide a relatively slow up-stroke and a relatively rapid down-stroke and the motor may be actuated from a source of compressed air, not shown, either periodically on an elapsed time basis or by means of a float actuator or a vacuum switch, the float responding to the increase in liquid level in the unfiltered liquid tank which comes about because of the lowering of the flow rate through the filter media due to accumulation of filtered solids thereon. If a vacuum switch is used, the switch would respond to an increase in vacuum in the filtered liquid receptacle. Periodically, therefore, the air cylinder serves to move the flexible diaphragm in a reciprocating motion so that on the down, or inward stroke filtered fluid will be forced back through the filter media dislodging solids which have accumulated on the outer face of the filter. The relatively slow back stroke of the air cylinder and hence the relatively slow outward motion of the diaphragm prevents redepositing of the solids back on the filter media. The series of reciprocating motions of the diaphragm 44, periodically provided by the actuating means 41, serves to renew the effectiveness of the filter media. When the filter media is to be serviced or replaced, the attaching members 46 may be removed, the tube 51 disconnected, and the filtered liquid receptable swung upwardly out of the tank by of the hinges carried on the brackets 34.

Figure 4:
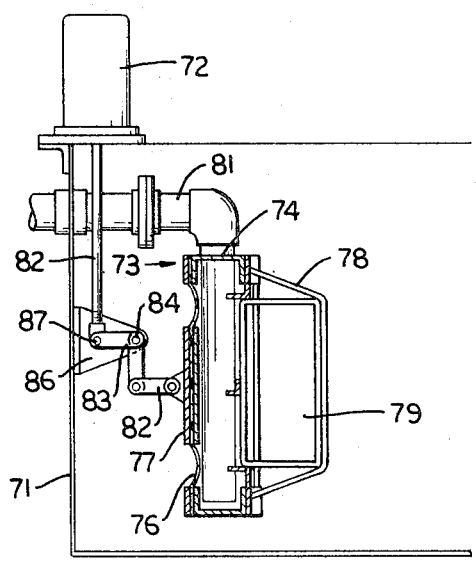
FIG. 4 is a fragmentary, side sectional view of a modified form of the invention.

Referring to FIG. 4, a modified form of the apparatus is illustrated which differs from that previously described primarily in that the wall of the filtered liquid receptacle formed by the filtered media is vertically mounted within the unfiltered liquid tank. This arrangement is primarily advantageous where at least a portion of the material which is filtered from the fluid and dislodged from the filter media by the pumping action of the diaphragm is lighter than the fluid and consequently floats to the surface of the liquid in the tank after it has been dislodged from the filter media. The vertical mounting of the filter media in the structure of FIG. 4 permits this material to float to the top of the liquid and may be skimmed therefrom but also permits any heavier filtered residue to fall to the bottom of the tank from which it may be dislodged by scrapers or conveyor elements such as indicated at 24 in FIG. 2. Referring in detail to FIG. 4, the structure there shown includes a portion of an unfiltered liquid tank 71 on the upper margin of which is mounted the conventional air cylinder 72 forming the actuating means and comparable to the air cylinder 41 of FIG. 3. Within the unfiltered liquid tank and below the liquid level is the filtered fluid receptacle indicated generally at 73 which, again, is composed of a generally rectangular frame element 74, having clamped thereto a movable wall taking the form of the flexible diaphragm 76 carrying a rigid central pressure plate 77. Opposite the movable wall is the wire frame 78 carrying the pleated filter media 79, the pleated filter material thus forming at least a portion of the wall of the filtered fluid receptacle opposite its movable wall.

A pipe or conduit 81 communicates with the interior of the filtered liquid receptacle and extends exteriorly of the tank 71 and is connected to suitable pumping apparatus, not shown. Connected to the pressure plate 77 is a link 82, pivotally connected to the crank arm 83, the crank arm being supported by the shaft 84 extending between spaced brackets 86. Pivotally connected at 87 to the crank arm 83 is the actuating rod 88 extending downwardly from the air cylinder 72 and periodically reciprocated by the air cylinder 72 to provide a pumping motion of the diaphragm 76 at intervals as needed. The rapid inward motion of the diaphragm pumps filtered fluid back reversely through the filter media 79 dislodging material adhering thereto and permitting it to float to the surface of the liquid. The relatively slow rearward stroke, produced by a conventional adjustment of the air cylinder, prevents the material from redepositing on the filter media during the back stroke, however, it will be understood that various means for relieving the pressure within the filtered liquid receptacle on the back stroke might be utilized, one such arrangement being the use of a solenoid valve controlled relief line (not shown) providing communication to the interior of the liquid level tank on the backstroke of the diaphragm. As shown in FIG. 4, the air cylinder 72, pipe 81, and pivot bracket 86 are mounted on the tank 71 itself, however, it should be noted that these elements and thus the mounting for the filtered fluid receptacle 73 might all be carried on a removable auxiliary manifold frame or support element (not shown) which would extend into the tank 71, this construction permitting raising of the frame and the receptacle 73 above the liquid level for changing the filter media without necessitating draining of tank 71.

We claim:

1. A liquid filtering apparatus comprising an open-topped filter tank providing a reservoir of unfiltered liquid, a filtered liquid receptacle disposed within said tank, one side margin of said receptacle being disposed parallel to and adjacent one side margin of said tank, hinge means extending between said adjacent tank and receptacle margins whereby said receptacle may be pivotally moved out of said tank, means for removing filtered liquid from the interior of said filtered receptatcle, a filter element forming the lower wall of the receptacle and disposed below the normal level of unfiltered liquid in said filter tank so that liquid moves through the filter element into said filtered liquid receptacle with filtered solids being retained at the outer face of the filter element, a flexible diaphragm forming the top wall of said receptacle and overlying said filter element, and a power element supported solely on said receptacle in overlying relation to said diaphragm and cooperating therewith to intermittently displace said diaphragm alternately toward and away from said filter element to thereby pump filtered liquid reversely through said filter element for removing filtered solids from the outer face of the filter element, the hinged connection of said receptacle to said tank permitting said receptacle to be pivotally moved clear of the liquid in said tank to expose said filter element for servicing without draining liquid from said tank.

References Cited

UNITED STATES PATENTS

| | | | |
|---|---|---|---|
| 1,626,951 | 5/1927 | Moses | 210—412X |
| 2,742,158 | 4/1956 | Schuller | 210—412X |
| 3,061,102 | 10/1962 | Mayer, Jr. | 210—411UX |
| 3,194,399 | 7/1965 | Harms | 210—106X |

FOREIGN PATENTS

| | | | |
|---|---|---|---|
| 197,682 | 9/1924 | Great Britain | 210—108 |
| 264,544 | 7/1927 | Great Britain | 210—412 |

SAMIH N. ZAHARNA, Primary Examiner